P. H. Jackson,

Windlass,

No. 1,141, Reissued Feb. 19, 1861.

Witnesses

Thos. Geo. Harold

Chas. H. Smith

Inventor

Peter H. Jackson

UNITED STATES PATENT OFFICE.

PETER H. JACKSON, OF NEW YORK, N. Y.

IMPROVEMENT IN SHIPS' WINCHES.

Specification forming part of Letters Patent No. 13,393, dated August 7, 1855; Reissue No. 1,141, dated February 19, 1861.

*To all whom it may concern:*

Be it known that I, PETER H. JACKSON, of the city, county, and State of New York, have invented, made, and applied to use a new and useful Improvement in Double-Acting Winches or Windlasses; and I do hereby declare that the following is a full, clear, and exact description of the construction and operation of the same, reference being had to the annexed drawings, making part of this specification, wherein—

Figure 2:
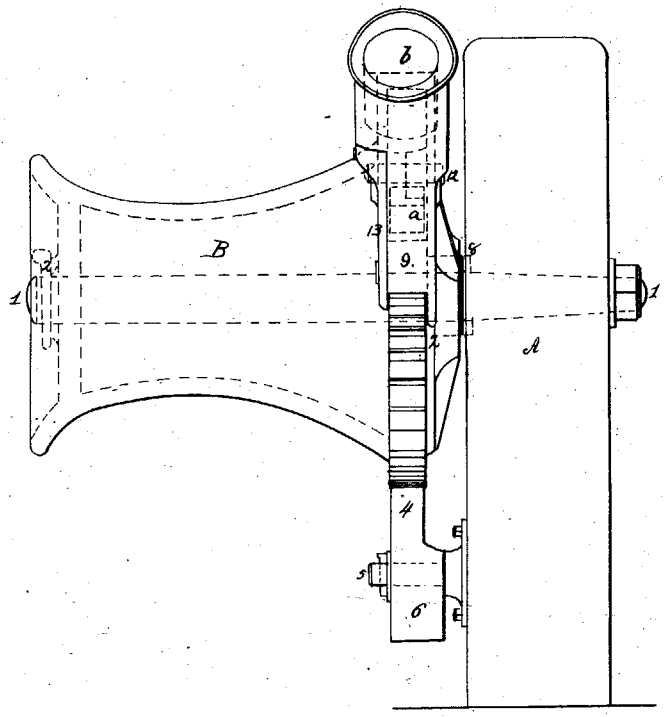
Figure 1:
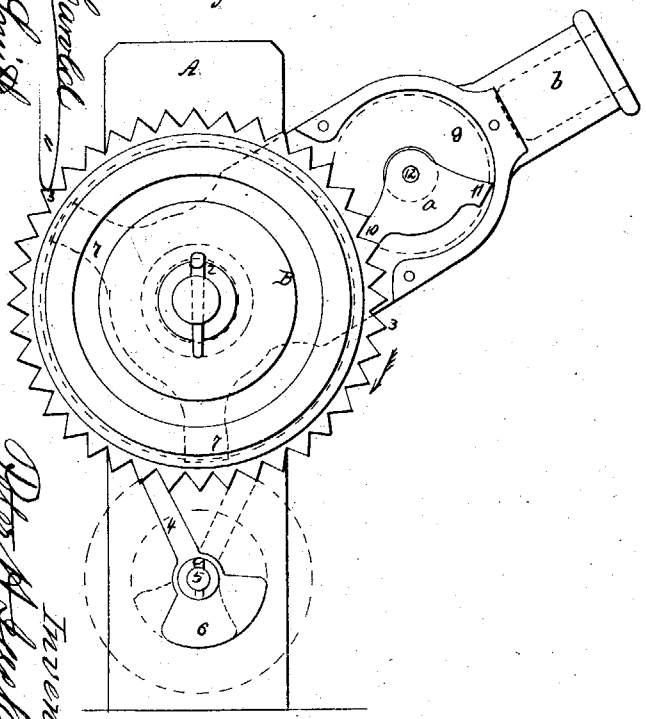

Figure 1 is an end view of a winch-head as fitted with my improvements, and Fig. 2 is a side elevation of the same.

Similar letters indicate the same parts.

The nature of my said invention consists in so applying a pawl beneath a ratchet-wheel that it can be thrown under its center and work into the ratchet-wheel when rotated in either direction; and also in a double-acting pawl upon a plate taking teeth by which a lever or handspike upon said plate can be worked on either side of the said ratchet-wheel, and the same, together with the shaft or winch-head to which the said ratchet wheel is attached, be rotated in either direction.

By these devices I am enabled to obtain a double acting winch or ratchet power by the use of only one ratchet-wheel, whereas almost, if not all, other double-acting ratchet purchases or winches have recourse to two ratchet-wheels to produce the rotation in either direction; and my double-acting motion is most especially adapted to winches, windlasses, and similar nautical machines, because when placed next the bit or stanchion carrying the same it is entirely out of the way in winding on or casting off a rope or chain from the said winch or windlass head.

A is a bit or timber carrying either a fixed or rotating shaft, 1, upon which a winch-head, B, is shown as attached by a washer and pin, 2, through the point of the shaft. 3 is a ratchet-wheel, either attached to the shaft or formed with the winch or other head, but here shown as formed with the winch-head. 4 is a pawl on a center-pin, 5, that is attached to the timber carrying the shaft 1, or to any other suitable support, and said pawl 4 is extended below the center and formed as a counter-weight, 6, of sufficient size always to keep the pawl 4 against the ratchet-teeth 3. The counter-weight is shorter from the center 5 than the point of the pawl 4, sufficiently so that said pawl can be depressed and turned around beneath the center 5 without the counter-weight coming in contact with the teeth 3, as seen by dotted lines in Fig. 1. Thus the pawl is thrown under instead of over, as is usually the case, and the counter-weight always acts to keep said pawl to the ratchet-teeth, whichever way the ratchet-wheel is rotated.

In order to attach the plate 7, carrying the handspike-socket *b*, by means of which the said double-acting ratchet-wheel is rotated in either direction, I make use of a hub or collar around the shaft 1, (see dotted lines at 8,) over which a hole in the plate 7 sets, so as to turn on said hub or collar; and the plate 7 should be strengthened by ribs, and made in the form shown by dotted lines in Fig. 1, in order to prevent any side motion or shaking to the handspike socket. This plate 7 is formed with a box, 9, on one side, extending over the ratchet-teeth 3 3, and fitted with a cover-plate, 13, attached by screws or other convenient means, and extending partly down on the outer side of the ratchet-teeth 3 toward the winch-head B. Within this box a center-pin, 12, carries a double-acting pawl, *a*, which pawl has ample room to turn around on its center-pin 12 within the box 9 until it takes the teeth 3.

The operation of this apparatus is, that when the handspike in the socket *b* is depressed the ratchet-wheel 3 will also be moved with it in the direction shown by the arrow, and the pawl 4 will retain the motion thus given; and on raising the handspike the point 10 of the pawl *a* will ride over the teeth 3, and then drop thereinto, ready for again being depressed, the point 11 acting as counterpoise to keep the point 10 into the teeth; but if the handspike and socket be turned over onto the other side of the ratchet wheel the pawl *a* will fall over backward, in consequence of the center of motion, 12, passing beneath the center of gravity of the pawl by the change of position of the handspike-socket, when the point 11 will take the teeth 3 to rotate the same in the opposite direction, and the point 10 (of the pawl) acts as a counterpoise to keep the point 11 to the teeth 3. The pawl 4 has to be thrown under, as before detailed, and the ratchet-wheel 3 is ready to be rotated in the other direction. In consequence of the counterpoise-weight 6 being shorter than the pawl 4, the reversing of the action is rendered possible and the pawl caused to act upward on either side of the center, which it is believed has never before been accomplished. The pawl *a*, in consequence of being formed with two points or arms, will allow of the handspike-socket being moved through a larger arc of a circle than if two separate pawls were used, because a single pawl is only operative while moving in such a manner that it will hang of its own weight against the teeth, whereas with my pawl the arm or point not against the teeth becomes a weight to keep the other arm to the teeth, so that the handspike can be moved through more than ninety degrees without the pawl either falling away from the teeth or reversing. It will be evident that my arrangement of ratchets and pawls has important advantages over all others, because there is nothing to prevent a rope being easily wound around the winch or cast off, whereas in cases where the handspike is applied at the outer end of the winch or windlass head the same has often to be pulled out of its socket to allow the rope to be taken off. In mine that is not the case.

I am aware that a single-acting pawl has be n counterpoised so as to act upward, and also that two pawls hung on separate centers have been used to rotate a windlass or winch in either direction; but

What I claim, and desire to secure by Letters Patent, is—

1. The pawl 4 and counter-weight 6, constructed as specified, so that the pawl can be reversed by turning it under the center 5, and the counter-weight will cause said pawl to act upward on either side of the center, as set forth.

2. The ratchet-wheel 3 of a windlass or winch and the reversible pawl 4 below said wheel, in combination with a double-acting heaver, as specified, by which arrangement a windlass or winch can be rotated in either direction by the use of one ratchet-wheel, as described and shown.

3. The pawl *a*, formed with two arms or points, as set forth, in combination with the socket or plate receiving the handspike or heaver, said pawl being reversible in the manner specified, so that the arm not in action becomes a counter-weight to the arm or point taking the ratchet-teeth, as set forth.

In witness whereof I have hereunto set my signature this 24th December, 1860.

PETER H. JACKSON.

Witnesses:
THOS. GEO. HAROLD,
CHAS. H. SMITH.